Figure 1:
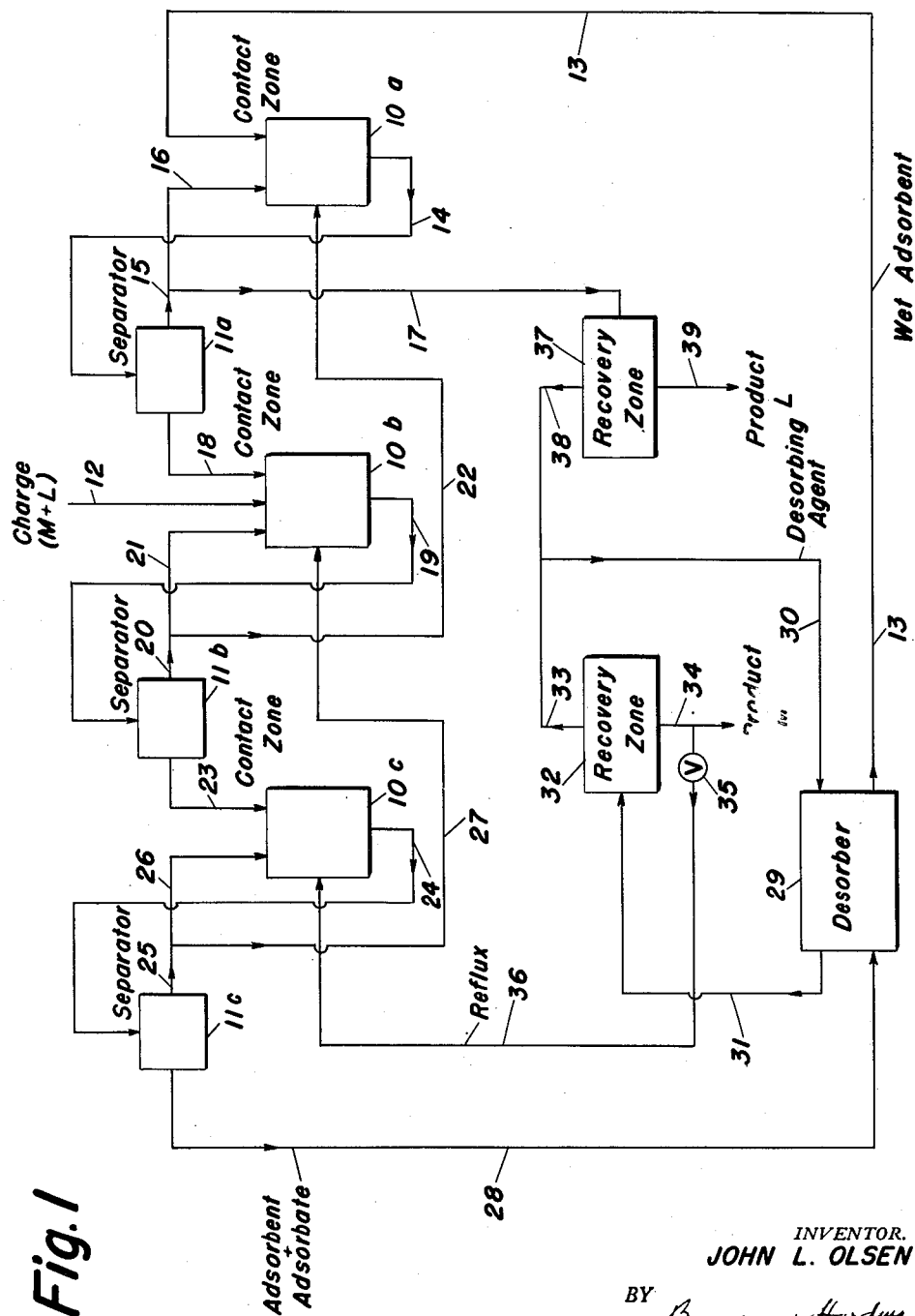

INVENTOR.
JOHN L. OLSEN

Patented Feb. 12, 1952

2,585,492

UNITED STATES PATENT OFFICE 2,585,492

CONTINUOUS ADSORPTION PROCESS

John L. Olsen, Upland, Pa., assignor to Sun Oil Company, Philadelphia, Pa., a corporation of New Jersey Application April 14, 1949, Serial No. 87,490

11 Claims. (Cl. 260—674)

This invention relates to the separation of organic materials by selective adsorption. More particularly it relates to a continuous method for effecting separation of components from a liquid organic mixture, in which method a selective adsorbent in particulate form is continuously passed through a series of contact zones within each of which the adsorbent and liquid being treated is maintained in the form of a suspension.

It is well recognized that different types of organic compounds often have different adsorbabilities on various known adsorbents and that such compounds may be separated to an extent from each other by treatment of a charge mixture with a suitable adsorbent. For example, it is known that highly polar organic compounds may be removed from less polar or non-polar organic substances by selective adsorption on various adsorbents. Likewise it is known that hydrocarbons may be selectively separated according to chemical type by means of certain adsorbents, such as silica gel or activated caron. Usually the hydrocarbons which are less saturated, i. e. which have more double bonds per molecule, are adsorbed preferentially to those which are more highly saturated. Thus the affinity of adsorbents for the several types of hydrocarbons usually increases in the following order: saturate hydrocarbons (i. e. paraffins and naphthenes); olefins; aromatics. The treatment of a mixture composed of two or more of such types of hydrocarbons with a suitable adsorbent accordingly will tend to effect separation according to chemical type. For instance, aromatics or olefins or both can be preferentially separated from saturate hydrocarbons, or aromatics can be selectively removed from olefins, by means of suitable known adsorbents.

The usual procedure for carrying out selective adsorption operations with a liquid charge mixture is merely to filter the charge through a stationary body of the adsorbent until its effectiveness for making a further separation of the components has decreased to an uneconomic level. Introduction of the charge is then discontinued and the adsorbate is removed from the contact mass. This may be accomplished by washing with a suitable solvent, heating, blowing with a gas such as steam or flue gas, or by a combination of such methods. The adsorbent is then re-used for further treatment of charge material in another cycle of operation.

The above described prior art procedure utilizing the adsorbent in the form of a stationary bed entails certain inherent disadvantages, especially in that the composition of product from the adsorption zone varies throughout the cycle therefore requiring proper selection and segregation of product cuts. Also, an intermediate portion of the filtrate product is apt to be of composition approaching that of the charge thus limiting the yields of desired product. Further, the decline in activity of adsorbent during use over a prolonged time necessitates shutting down the operation for replacement, as continuous replacement in amount sufficient to maintain the desired activity is not practicable where the adsorbent is maintained as a stationary body.

The present invention is directed to a continuous process for effecting separations by selective adsorption in which the adsorbent is continuously recycled through a system comprising a plurality of contact zones in series. The process may be so regulated as to effect substantially any desired degree of separation between the charge components, and the products obtained under any selected set of operating conditions will be of substantially constant composition at all times during the operation. The process also lends itself to continuous replacement of the adsorbent, if desired, so that the activity of the circulating adsorbent may be maintained at a constant level.

Briefly, the process according to the invention comprises continuously introducing the adsorbent, wet with a suitable desorbing agent, into the first of a series of separate contact zones and causing it to pass continuously through the series of contact zones. The organic charge mixture is continuously fed as a liquid into one of the zones, preferably an intermediate zone, in the series. In each zone the adsorbent is maintained in suspension in the organic liquid being treated therein, and a continuous stream of the suspension is withdrawn from each contact zone and fed to an individual separation zone. In each of the latter zones non-adsorbed liquid is separated from the adsorbent and adsorbate. A portion of the non-adsorbed liquid is returned to the contact zone from which it was withdrawn, while the remainder is fed to the contact zone next upstream with respect to the direction of adsorbent flow. The adsorbent-adsorbate mixture is fed from each separation zone except the last into the contact zone next downstream. The adsorbent-adsorbate mixture separated from the suspension obtained from the last contact zone is transferred to a desorption zone and therein treated with a suitable organic liquid desorbing agent to displace the adsorbate. A mixture of desorbing agent and adsorbate is separated from the treated adsorbent and is subjected to treatment adapted to recover the desorbing agent. A portion of the resulting adsorbate is continuously fed back into the last contact zone in the series as reflux, while the remainder is withdrawn as one product of the process. This product comprises the more asborbable charge component in enriched form. Non-adsorbed liquid separated from the suspension obtained from the first contact zone in the series, or preferably a portion thereof, is transferred to a recovery zone wherein desorbing agent is removed from the material derived from the charge. The latter material constitutes the less adsorbable component in enriched form and is withdrawn as the other product of the process. Wet adsorbent obtained from the desorption zone, carrying desorbing agent in adsorbed phase, is recycled directly back to the first contact zone for further use in the process.

Any adsorbent which will preferentially adsorb one type of component in the particular charge mixture to be separated may be used in conducting the process. Preferably an adsorbent which has a high adsorption capacity and a high degree of selectivity between the components of the charge mixture is employed. Among the commercially available adsorbents silica gel and activated carbon have adsorptive properties which are especially suitable for separating many types of organic mixtures to which the present process is applicable. Silica gel is especially effective for selectively adsorbing a more highly polar compound from a less highly polar compound or for separating hydrocarbons having different degrees of saturation. Activated carbon is also effective for separating hydrocarbons according to chemical type and in some instances will, to an extent, separate hydrocarbons of the same type according to molecular weight. In many cases activated carbon is capable of selectively adsorbing non-polar compounds, for example hydrocarbons, from polar compounds, for example alcohols, ethers, esters, ketones, aldehydes, etc. It is to be understood, however, that the process according to the invention may be practiced with other types of adsorbents and in fact with any other adsorbent which exhibits a substantial selectivity between the components of the particular charge mixture to be treated.

Figure 2:
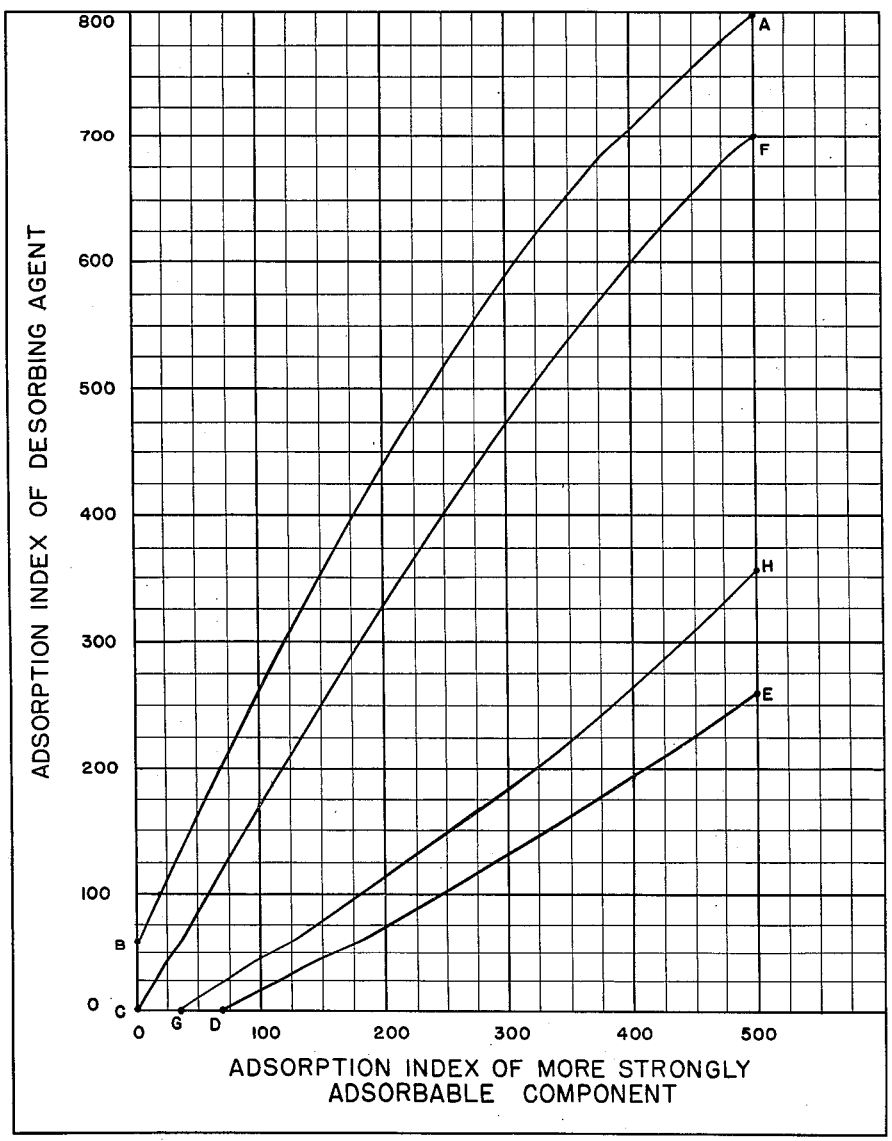
Figure 3:
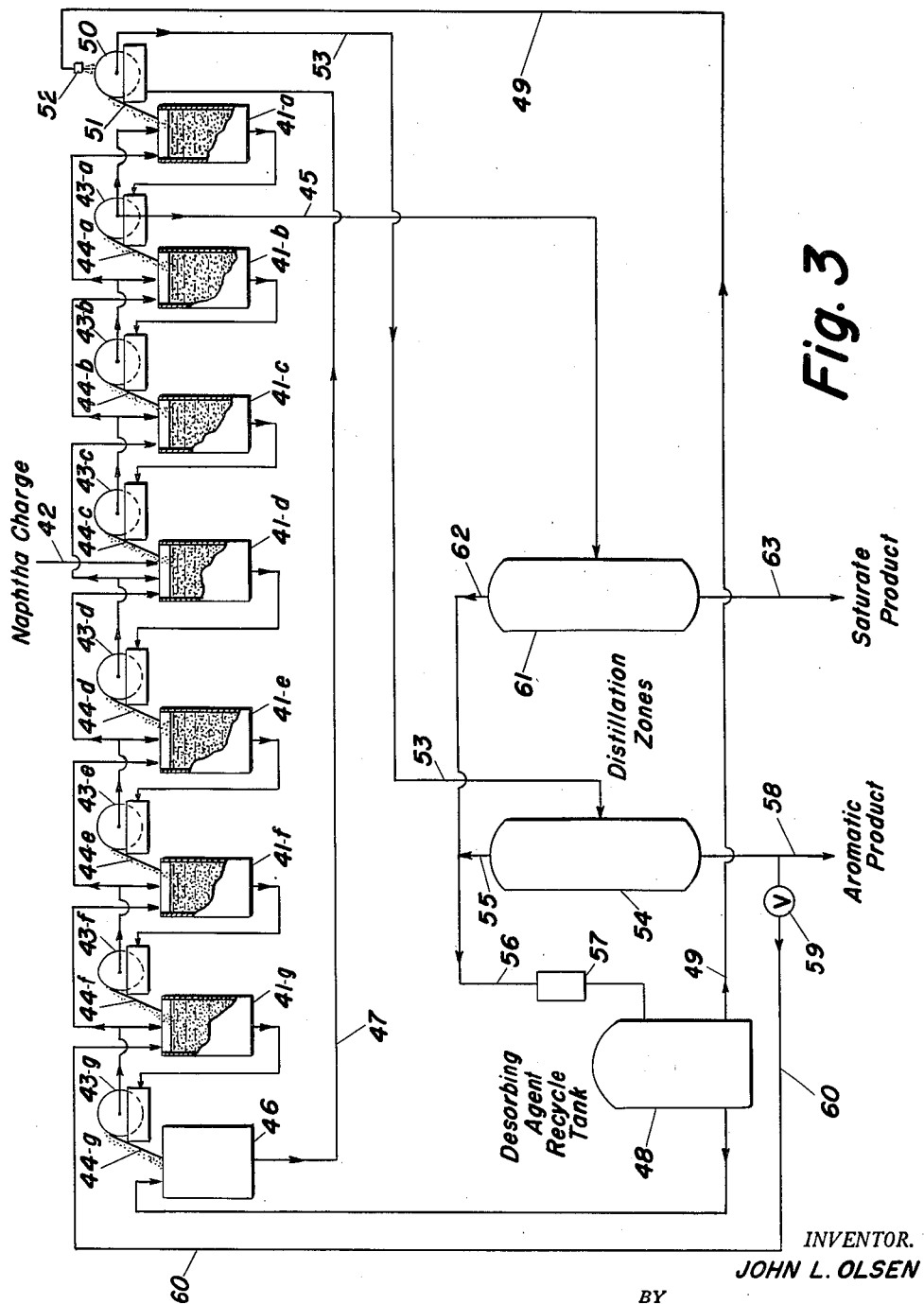

The description which follows is made with reference to the accompanying drawings in which:

Fig. 1 is a simplified diagrammatic illustration of the process;

Fig. 2 constitutes a chart useful in selecting a suitable desorbing agent for the process; and Fig. 3 is a diagrammatic view partly in section illustrating one embodiment of the process in more detail.

Referring to Fig. 1, the process is illustrated therein as including three contact zones arranged in series and designated 10–a, 10–b and 10–c, but it is to be understood that the process may be practiced with any number of contact zones that may be required to effect the separation desired. After each contact zone individual separators 11–a, 11–b, and 11–c are provided for removing non-adsorbed liquid from the mixture of adsorbent and adsorbate.

The charge mixture, which for purposes of illustration may be considered to be composed of components M and L, with M being the more strongly adsorbable component, is fed continuously in liquid form through line 12 into the intermediate contact zone 10–b. Adsorbent wet with desorbing agent is continuously introduced in any suitable manner through line 13 into contact zone 10–a and is therein maintained in the form of a suspension of adsorbent in the liquid therein being treated. Agitating means (not shown) may be provided, if necessary, to insure that the adsorbent will remain suspended in the liquid. A stream of the suspension is continuously withdrawn from contact zone 10–a through line 14 and is sent to separator 11–a, wherein separation of the non-adsorbed liquid from adsorbent and adsorbate is effected. The non-adsorbed liquid, which comprises desorbing agent and component L, is continuously withdrawn through line 15 and a portion of it is passed through line 16 back into contact zone 10–a. The remainder is sent through line 17 to a recovery or separation zone as hereinafter described.

The main purpose in returning a portion of the non-adsorbed liquid from the separator to the contact zone from which it was withdrawn is to insure that the ratio of liquid to adsorbent within the contact zone will be sufficiently high that the mixture will be a fluid suspension. Ordinarily a relatively high ratio of adsorbent to charge material will be required to achieve the degree of separation desired, in which case it will be necessary to return a portion—usually a major portion—of the liquid from the separation zone to the contact zone so that the mixture in the contact zone will be in the desired fluid state rather than in the form of a wet mass.

The adsorbent-adsorbate mixture obtained from separator 11–a is introduced through line 18 into the feed stage contact zone 10–b. An adsorbent-liquid suspension is likewise maintained in this zone and a stream of the same is continuously withdrawn through line 19 and sent to separator 11–b wherein separation of the non-adsorbed liquid from adsorbent and adsorbate is again effected. The non-adsorbed liquid passing from separator 11–b through line 20 is returned in part through line 21 back to contact zone 10–b while the remainder is passed through line 22 to contact zone 10–a.

The adsorbent-adsorbate mixture obtained from separator 11–b is introduced by means of line 23 into the next contact zone 10–c where again a fluid suspension is maintained. A stream of the suspension is likewise withdrawn from contact zone 10–c and introduced through line 24 into separator 11–c. Again a separation of non-adsorbed liquid from the adsorbent and adsorbate is effected; and the non-adsorbed liquid withdrawn through line 25 is sent in part through line 26 back to contact zone 10–c, the remainder being passed through line 27 to contact zone 10–b.

The adsorbent-adsorbate mixture obtained from the last separator 11–c is passed through line 28 to a desorption zone 29 wherein it is contacted with a liquid desorbing agent, having characteristics as hereinafter specified, which enters the desorber through line 30 and effects displacement of the adsorbate from the adsorbent. A mixture of desorbing agent and adsorbate leaves the desorber 29 through line 31 and passes to recovery zone 32 in which a separation of desorbing agent from the adsorbate fraction is effected in any suitable manner, for example, by distillation. The recovered desorbing agent passes from zone 32 by means of line 33, while the adsorbate material leaves through line 34. A portion of the adsorbate is withdrawn from the system at this point and constitutes the product which contains component M in enriched form. The remainder is returned through valve 35 and line 36 to contact zone 10-c and serves as reflux for the operation.

The absorbent which is removed from desorber 29 by means of line 13 is wet with desorbing agent and is returned directly to contact zone 10-a for re-use in the process.

The portion of non-adsorbed liquid from the first separation zone 11-a which flows through line 17 enters a second recovery zone 37, which suitably may be a distillation zone, and the desorbing agent is separately removed through line 38. Material constituting component L in enriched form is withdrawn through line 39 as the other product of the process. Desorbing agent recovered from each of the recovery zones 32 and 37 passes via line 30 to desorber 29 for re-use in the process.

The above described process is somewhat analogous in principle to a conventional plate to plate fractional distillation process although not strictly so. However, such analogy may be drawn as an aid in understanding the fundamental principles and the factors upon which the effectiveness of separation depends. It is well recognized that in order to attain a desired degree of separation of a mixture in fractional distillation the number of theoretical plates employed and the reflux ratio used are important and interrelated. For any particular separation there is a minimum number of theoretical plates (corresponding to an infinite reflux ratio) and a minimum reflux ratio (corresponding to an infinite number of theoretical plates) that must be employed. These depend upon the relative volatility of the components being separated. As the number of theoretical plates is increased the necessary reflux ratio for obtaining the separation decreases. In practice the number of plates and the corresponding reflux ratio are selected to give the most economical operation.

In the present process the selectivity of the adsorbent or in other words the relative adsorbabilities of the components is comparable to relative volatilities in distillation. The adsorbent functions in a manner equivalent to the heat supplied in distillation. The liquid phase of the suspension in each contactor and the adsorbed phase on the adsorbent are analogous, respectively, to the liquid and vapor within a distillation column; and transfer of material between the liquid phase and the adsorbed phase is equivalent to the transfer between liquid and vapor in distillation. The portion of adsorbate product which is returned to the last contact zone in the series is similar to reflux returned to the top of a distillation column; while the non-adsorbed liquid that is sent to the contact zone next upstream from the zone from which it is obtained is similar to the liquid that flows from plate to plate in a distillation tower. That portion of non-adsorbed liquid which is returned to the same zone from which it was obtained does not, however, have any analogy in the ordinary distillation procedure. There are a minimum number of theoretical adsorption stages and a minimum reflux ratio, dependent upon the relative adsorbabilities of the components being separated, below which values the particular degree of separation desired cannot be accomplished. Accordingly, the required number of adsorption stages and reflux ratio for operating the present process to achieve any given degree of separation may be determined from relative adsorbability data by means of engineering calculations similar to those used for distillation operations. In such manner the rates of addition and withdrawal of streams in the process and the required number of contact zones may be ascertained. The rate of movement of adsorbent determines, together with its adsorptive capacity, the rate at which adsorbate moves through the system, just as the boil-up rate in distillation determines the rate of flow of vapors. It is to be noted, however, that the return of adsorbent containing a third component (desorbing agent) in adsorbed phase to the first contact zone in the series constitutes a feature which has no analogy in conventional fractional distillation. While this complicates the calculations somewhat, nevertheless such calculations may be made upon principles fundamentally the same as used for distillation processes.

Desorbing agents which can be used in practicing the above described process may be classified generally as liquid organic solvents, that is, organic liquids in which the charge components are soluble or at least are soluble to such extent that there will be complete miscibility at the concentrations prevailing within the contact zones. It is preferable to use as desorbing agent a solvent which has complete miscibility with the charge components at all concentrations. When distillation is to be used to remove the desorbing agent from the products, it of course should have a boiling point substantially different from the charge components to permit ready separation. It is generally advantageous to select a desorbing agent which has a low viscosity, although this is not necessarily essential for satisfactory operation of the process. It is essential that the desorbing agent selected have adsorbability characteristics falling within certain limits with respect to the adsorbability of the more adsorbable charge component (M), as more fully explained below. The desorbing agent may, within limits, be either less strongly adsorbable or more strongly adsorbable than component M on the particular adsorbent being used in the process. However, if it is too weakly adsorbed relative to component M, it will not be effective to displace M from the adsorbent during the desorption step unless an unreasonably large proportion of desorbing agent is employed. On the other hand, if it is too strongly adsorbed, it will not be displaceable from the wet adsorbent returned to the first contact zone and therefore will render the adsorbent incapable of adsorbing charge material.

For the purpose of specifying the adsorbability characteristics of the desorbing agent to be used according to this invention, the concept of adsorption index is herein utilized. Such means of defining adsorptive properties of compounds have been described in Hirschler et al. Patent No. 2,441,572 in connection with another type of adsorption process utilizing a fixed adsorbent bed. For the present purpose the adsorption index of a compound may be defined as the apparent number of cubic centimeters of the compound adsorbed by one kilogram of the adsorbent when the latter is in equilibrium with a solution consisting of 0.2% of such compound and 99.8% of isooctane. (For a detailed discussion of the determination of adsorption index reference should be made to the above-mentioned patent to Hirschler et al.) The adsorption index may thus be considered as the amount of the compound adsorbed from a standard liquid at a standard concentration and therefore a measure of the affinity of the particular adsorbent used for the compound. A low adsorption index indicates a weakly adsorbable compound while a high adsorption index indicates one that is strongly adsorbable. The adsorption index for a given compound will vary of course with different types of adsorbents and in fact will vary even with different lots of the same type of adsorbent where the lots have different inherent activities. With any given adsorbent, however, the adsorption index for a particular compound will be fixed. Isooctane has been arbitrarily chosen as the standard liquid to use in determining adsorption index for the present purpose, but as a general rule other saturate hydrocarbons may be substituted for isooctane without substantially affecting the values obtained.

In determining whether an organic solvent will be suitable as desorbing agent where a particular charge mixture is to be separated in accordance with the invention, reference should be had to Fig. 2 which discloses a chart defining the upper and lower limits of adsorbability for the desorbing agent. To utilize Fig. 2 it is first necessary to know the adsorption index of the organic solvent in question and also the adsorption index of the more strongly adsorbable component (M) of the charge. The chart shows the maximum and minimum permissible limits of adsorption index for the solvent as a function of the adsorption index of component M and also preferred maximum and minimum values to insure more economic operation. The upper permissible limit is defined by the line AB, while the lower permissible limit is defined by the lines CD and DE. Thus if the point fixed by the adsorption index values for the two materials falls within the area ABCDE, the organic solvent will be operable as a desorbing agent in the process. Preferred desorbing agents, however, have an upper limit defined by the line FC and a lower limit defined by the lines CG and GH. Desorbing agents having the preferred characteristics will therefore fall within the area FCGH. As a general rule, the best desorbing agents to use are those having adsorption indices approximately the same as the more adsorbable component.

As a more specific illustration of the use of Fig. 2, assume for example that a mixture of M and L is to be separated and that M, the more adsorbable component, has an adsorption index of 150. By reference to Fig. 2, it can be seen that the desorbing agent used must have an adsorption index between about 45 and 350. Any organic solvent which is found to have an adsorption index within these limits would therefore be operative in the process. It would be preferable, however, to use a solvent having an adsorption index between about 80 and 250 so as to insure efficient operation.

As a further illustration, assume that a naphtha fraction boiling from say 300–400° F. and composed of aromatic and saturate hydrocarbons is to be separated into an aromatic product and a saturate product, employing silica gel as the adsorbent. In such case the aromatics may have an adsorption index in the neighborhood of 30, subject to some variation dependent upon the inherent activity of the silica gel used, while the adsorption index of the saturates based on isooctane will be approximately zero. Reference to Fig. 2 shows that the desorbing agent should have an adsorption index within the range of 0–120 and preferably within the range of 0–53. Suitable organic solvents for making the separation accordingly may readily be selected from compounds whose adsorption indices have been determined with silica gel of the same activity. Some typical values for various organic solvents with such silica gel are given in the accompanying table. The data show that there are numerous organic solvents which could be used for making the desired separation and that many of them come within the preferred range. Isoamyl chloride is shown to have adsorption properties near the upper limit of the preferred range. Solvents having adsorption indices relatively close to that of the aromatics being separated, such as, for example, chlorobenzene, methylene chloride, benzene, n-propylbromide, brombenzene, tert-butylchloride, toluene and ethylene dichloride, would be especially satisfactory desorbing agents in the process.

TABLE

*Adsorption indices of various organic solvents on silica gel*

| Compound | Adsorption Index |
|---|---|
| saturate hydrocarbons | about 0 |
| cyclohexene | 3 3 |
| trichloroethylene | 5.8 |
| 3-chloropentane | 8.2 |
| m-chlorobenzotrifluoride | 8.6 |
| chloroform | 12 |
| o-dichlorbenzene | 15 |
| chlorbenzene | 19 |
| methylene chloride | 21 |
| benzene | 24 |
| n-propylbromide | 26 |
| s-tetrachlorethane | 28 |
| brombenzene | 30 |
| tert-butylchloride | 31 |
| toluene | 31 |
| ethylene dichloride | 38 |
| iso-amyl chloride | 50 |
| benzotrichloride | 54 |
| 1,2,3-trichloropropane | 55 |
| benzyl chloride | 64 |
| benzal chloride | 90 |
| 1,4-dichlorobutane | 91 |
| nitropropane | 101 |
| benzyl mercaptan | 136 |
| dioxane | 145 |
| nitrobenzene | 162 |
| m-nitrobenzotrifluoride | 181 |
| methyl salicylate | 189 |
| benzaldehyde | 190 |
| ethyl acetate | 195 |
| benzyl ether | 198 |
| pyridine | 204 |
| diisobutylketone | 212 |
| diisopropyl ether | 212 |
| m-aminobenzotrifluoride | 228 |
| cyclohexanol | 252 |
| sec-butyl alcohol | 260 |
| ethyl alcohol | 260 |
| 2-methyl-2,4-pentanediol | 279 |
| n-butyl amine | 283 |
| morpholine | 286 |

Fig. 3 shows a more specific embodiment of the invention, in which the process is conducted with seven contact zones, three being above the feed stage and three below. By way of illustration the process will be described for separating a gasoline or naphtha fraction, for example, a naphtha boiling in the range of 300–400° F., into an aromatic product and a saturate hydrocarbon product. For such separation silica gel or activated carbon would be a particularly suitable adsorbent. In the present description the process will be considered as utilizing silica gel as the adsorbent. Also it will be assumed that the desorbing agent employed is a relatively low boiling aromatic, for example, benzene.

In the process of Fig. 3 finely divided silica gel which is wet with benzene is fed continuously from a rotary filter 50 having a scraper 51 into the first of a series of contact zones, designated as 41-a, 41-b, 41-c, 41-d, 41-e, 41-f and 41-g, and the naphtha charge is continuously introduced as a liquid through line 42 into the middle contact zone 41-d. In each zone a fluid suspension of silica gel in the hydrocarbons therein being treated is maintained in any suitable manner. For this purpose agitating means, such as a stirrer, may be provided in each zone, if desired, in order to keep the silica gel suspended in the hydrocarbons. However, when the silica gel is sufficiently finely divided and there is sufficient turbulence resulting from introduction of the various streams, no additional means for agitating will be required. From the bottom of each contact zone a stream of the suspension is continuously withdrawn and sent to a separation zone, illustrated in Fig. 2 as rotary filters 43-a, 43-b, 43-c, 43-d, 43-e, 43-f and 43-g. The filters are provided with scrapers 44-a, 44-b, 44-c, 44-d, 44-e, 44-f and 44-g, adapted to continuously remove the silica gel-adsorbate mixture from the filter and direct the same into the next downstream contact zone. The non-adsorbed liquid filtrate issuing from each of the filters is sent in part to the contact zone from which it was obtained while the remainder is passed to the next upstream contact zone, in the manner described in connection with Fig. 1. The amount of filtrate which is returned to the same contact zone from which it was derived need be only enough to insure that the silica gel-hydrocarbon mixture in the zone remains in the form of a liquid suspension.

Upon contact of the naphtha charge with the silica gel in zone 41-d, aromatics will tend to be selectively adsorbed and carried with the adsorbent to the next downstream contact zone 41-e, while the saturate hydrocarbons will tend to concentrate in the filtrate and therefore move in an upstream direction. Likewise, selective separation of aromatics from non-aromatics will occur in contact zone 41-e, so that aromatics will be preferentially carried by the adsorbent to contact zone 41-f while any saturate hydrocarbons will tend to move back to contact zone 41-d. Such tendencies as to the direction of flow of the charge components will prevail throughout the series of contact zones, resulting in the concentration of saturates at one end and aromatics at the other end of the series. The benzene which is carried by the silica gel that enters the first contact zone 41-a will be displaced at least partially from it and will therefore be present in the filtrate leaving filter 43-a. A portion of the benzene may be carried by the silical gel through the series of contact zones and thus be present in the adsorbate which is held by the silica gel leaving the last contact zone 41-g. The amount of benzene carried through the system in this manner will depend to an extent upon the number of contact stages between the first contact zone and the feed zone.

The product from the upstream end of the series is withdrawn from filter 43-a by means of line 45 and is composed of saturates in enriched form in admixture with benzene. At the other end of the series silica gel is removed from filter 43-g by means of scraper 44-g from which it falls into hopper 46, and carries with it adsorbate composed of aromatics in enriched form together with any benzene which has been carried through the system.

The silica gel containing such adsorbate is removed from the bottom of hopper 46 and passed in any suitable manner, for instance by means of a screw conveyor (not shown), through line 47 to another rotary filter 50 which suitably may be located close to the first contact zone 41-a as shown in Fig. 3. The filter cake which forms on the surface of the filter drum is continuously washed with benzene in order to desorb the charge aromatics from the silica gel before the latter is transferred by means of scraper 51 back into contact zone 41-a. This may be done by passing a stream of benzene from recycle tank 48 via line 49 to filter 50 and spraying it on the filter cake by means of one or more spray nozzles, indicated by numeral 52, located above the filter drum. A sufficient amount of benzene is sprayed on the filter cake to wash substantially all of the charge aromatics through the filter surface, leaving essentially benzene as adsorbate on the silica gel which passes into contact zone 41-a.

The filtrate from rotary filter 50, which is composed of benzene and charge aromatics, passes through line 53 to a separation zone illustrated as distillation zone 54. Benzene is distilled overhead and flows through lines 55 and 56 and condenser 57, thence returning to recycle tank 48. The residuum from distillation zone 54 is composed of charge aromatics in enriched form, and a portion of it is removed from the system through line 58 as the aromatic product. The remainder is sent through valve 59 and line 60 back to contact zone 41-g as reflux.

The mixture of saturate hydrocarbons and benzene which flows from filter 43-a through line 45 enters another distillation zone 61 and is therein subjected to distillation to recover the benzene. The latter passes through lines 62 and 56 and condenser 57 back to recycle tank 48. Residuum from distillation zone 61 is withdrawn through line 63 as the saturate product of the process.

In practicing the invention substantially any desired product purity may be obtained as to either the saturate or aromatic product or both by employing a sufficient number of contact zones and by operating under the necessary reflux conditions. The number of contact zones and the amount of reflux that should be used for any given degree of separation may readily be determined by engineering calculations analogous to those employed for conventional distillation processes.

In some cases it may be desired to practice the process without any contact stages upstream from the feed stage, such as, for example, where it is desired to obtain the more adsorbable component in relatively pure form but where the percentage recovery of such component from the charge is not of particular importance. In such instance, one or more contact zones may be provided downstream from the feed stage, the number being sufficient to effect the desired degree of purification, without any contact zones upstream from the feed stage. If this is done, it is preferable to use as desorbing agent a solvent which has a relatively low adsorption index as compared to the more adsorbable component. While solvents having relatively high adsorption indices may be used, this is generally not desirable in such case as it will require the circulation of a large amount of adsorbent relative to the amount of charge being treated. As a general rule, however, it will be preferred to conduct the process utilizing a multiplicity of contact zones with the charge material being introduced to an intermediate zone in the series.

It will be seen that the principles of the present invention are applicable to the separation of a great variety of organic mixtures, including not only hydrocarbons but also non-hydrocarbons. For instance, mixtures of various types of such compounds as listed in the foregoing table may be separated according to the present process. In fact the process is capable of resolving any liquid organic mixture into its component parts where the components have substantially different adsorbabilities on the particular adsorbent selected for use. It is to be understood that the invention is not limited to the treatment of binary mixtures but also embraces multicomponent mixtures containing one or more compounds having adsorbabilities intermediate those of the most adsorbable and least adsorbable components. In such case the intermediate compound or compounds will tend to concentrate in one or the other of the products of the process depending upon whether the adsorptive properties more nearly approach those of the most adsorbable component or of the least adsorbable component. Products so obtained may be retreated according to the invention to effect further separation.

Having described my invention, what I claim and desire to protect by Letters Patent is:

1. Continuous process for separating a liquid charge mixture of organic materials of different adsorbabilities by means of a selective adsorbent which comprises introducing a particulate adsorbent, saturated with a desorbing agent as hereinafter specified, into the first of a series of contact zones and passing the adsorbent through said series of contact zones in the manner hereinafter specified, introducing a liquid stream of the charge into one of said contact zones other than the last in said series, maintaining in each contact zone a suspension of adsorbent in the organic liquid being treated therein, withdrawing from each contact zone a stream of such suspension and feeding it to an individual separation zone, threin separating non-adsorbed liquid from adsorbent and adsorbate, continuously introducing the separated adsorbent and adsorbate from each individual separation zone other than the last into the contact zone next downstream with respect to the direction of adsorbent flow through the system, continuously returning a portion of such non-adsorbed liquid from each individual separation zone to the contact zone from which it was withdrawn, continuously passing the remainder of such non-adsorbed liquid from each separation zone other than the first to the next upstream contact zone, passing the adsorbent and adsorbate obtained from the last separation zone to a desorption zone, therein treating the adsorbent with a liquid organic solvent desorbing agent to displace the adsorbate from the adsorbent, said desorbing agent having an adsorption index falling within the area ABCDE of Fig. 2, withdrawing a mixture of desorbing agent and displaced adsorbate from the desorption zone and introducing it into a recovery zone, therein recovering the desorbing agent from said adsorbate, continuously returning a portion of the adsorbate having essentially the same composition as the total adsorbate to said last contact zone as reflux, withdrawing the remainder of the adsorbate as one product of the process, passing the remainder of non-adsorbed liquid obtained from the first separation zone to a second recovery zone and therein recovering desorbing agent from the material derived from the discharge, withdrawing such material as the other product of the process, and returning adsorbent saturated with desorbing agent to said first contact zone for re-use in the process.

2. Process according to claim 1 wherein the desorbing agent has an adsorption index falling within the area of FCGH of Fig. 2.

3. Continuous process for separating a liquid charge mixture of organic materials of different adsorbabilities by means of a selective adsorbent which comprises introducing a particulate adsorbent, saturated with a desorbing agent as hereinafter specified, into the first of a series of contact zones and passing the absorbent through said series of contact zones in the manner hereinafter specified, introducing a liquid stream of the charge into an intermediate contact zone, maintaining in each contact zone a suspension of adsorbent in the organic liquid being treated therein, withdrawing from each contact zone a stream of such suspension and feeding it to an individual separation zone, therein separating non-adsorbed liquid from adsorbent and adsorbate, continuously introducing the separated adsorbent and adsorbate from each individual separation zone other than the last into the contact zone next downstream with respect to the direction of adsorbent flow through the system, continuously returning a portion of such non-adsorbed liquid from each individual separation zone to the contact zone from which it was withdrawn, continuously passing the remainder of such non-adsorbed liquid from each separation zone other than the first to the next upstream contact zone, passing the adsorbent and adsorbate obtained from the last separation zone to a desorption zone, therein treating the adsorbent with a liquid organic solvent desorbing agent to displace the adsorbate from the adsorbent, said desorbing agent having an adsorption index falling within the area ABCDE of Fig. 2, withdrawing a mixture of desorbing agent and displaced adsorbate from the desorption zone and introducing it into a recovery zone, therein recovering the desorbing agent from said adsorbate, continuously returning a portion of the adsorbate having essentially the same composition as the total adsorbate to said last contact zone as reflux, withdrawing the remainder of the adsorbate as one product of the process, passing non-adsorbed liquid obtained from the first separation zone to a second recovery zone and therein recovering desorbing agent from the material derived from the charge, withdrawing such material as the other product of the process, and returning adsorbent saturated with desorbing agent to said first contact zone for re-use in the process.

4. Process according to claim 3 wherein the charge mixture is composed of hydrocarbons having different degrees of adsorbability, the adsorbent is silica gel and the desorbing agent has an adsorption index falling within the area FCGH of Fig. 2.

5. Process according to claim 3 wherein the charge mixture is composed of hydrocarbons having different degrees of adsorbability, the adsorbent is activated carbon and the desorbing agent has an adsorption index falling within the area FCGH of Fig. 2.

6. Continuous process for separating a liquid hydrocarbon charge composed of aromatic and saturate hydrocarbons into an aromatic product and a saturate product by means of a selective adsorbent which comprises introducing finely divided adsorbent, saturated with a desorbing agent as hereinafter specified, into the first of a series of contact zones and passing the adsorbent through said series of contact zones in the manner hereinafter specified, introducing a liquid stream of said hydrocarbon charge into an intermediate contact zone in said series, maintaining in each contact zone a suspension of adsorbent in the liquid being treated therein, withdrawing from each contact zone a stream of such suspension and feeding it to an individual separation zone, therein separating non-adsorbed liquid from adsorbent and adsorbate, continuously introducing the separated adsorbent and adsorbate from each individual separation zone other than the last into the contact zone next downstream with respect to the direction of adsorbent flow through the system, continuously returning a portion of such non-adsorbed liquid from each individual separation zone to the contact zone from which it was withdrawn, continuously passing the remainder of such non-adsorbed liquid from each separation zone other than the first to the next upstream contact zone, passing the adsorbent and adsorbate obtained from the last separation zone to a desorption zone, therein treating the adsorbent with a liquid organic solvent desorbing agent to displace the adsorbate from the adsorbent, said desorbing agent having an adsorption index falling within the area ABCDE of Fig. 2, withdrawing a mixture of desorbing agent and displaced adsorbate from the desorption zone and introducing it into a distillation zone, therein recovering the desorbing agent from said adsorbate, continuously returning a portion of the adsorbate having essentially the same composition as the total adsorbate to said last contact zone as reflux, withdrawing the remainder of the adsorbate as the aromatic product, passing non-adsorbed liquid obtained from the first separation zone to a second distillation zone and therein recovering desorbing agent from charge hydrocarbons, withdrawing such charge hydrocarbons from said second distillation zone as the saturate product of the process, and returning adsorbent saturated with desorbing agent to said first contact zone for re-use in the process.

7. Process according to claim 6 wherein the adsorbent is silica gel and the desorbing agent has an adsorption index falling within the area FCGH of Fig. 2.

8. Process according to claim 6 wherein the adsorbent is activated carbon and the desorbing agent has an adsorption index falling within the area FCGH of Fig. 2.

9. Continuous process for separating a liquid hydrocarbon charge composed of olefinic and saturate hydrocarbons into an olefinic product and a saturate product by means of a selective adsorbent which comprises introducing finely divided adsorbent, saturated with a desorbing agent as hereinafter specified, into the first of a series of contact zones and passing the adsorbent through said series of contact zones in the manner hereinafter specified, introducing a liquid stream of said hydrocarbon charge into an intermediate contact zone in said series, maintaining in each contact zone a suspension of adsorbent in the liquid being treated therein, withdrawing from each contact zone a stream of such suspension and feeding it to an individual separation zone, therein separating non-adsorbed liquid from adsorbent and adsorbate, continuously introducing the separated adsorbent and adsorbate from each individual separation zone other than the last into the contact zone next downstream with respect to the direction of adsorbent flow through the system, continuously returning a portion of such non-adsorbed liquid from each individual separation zone to the contact zone from which it was withdrawn, continuously passing the remainder of such non-adsorbed liquid from each separation zone other than the first to the next upstream contact zone, passing the adsorbent and adsorbate obtained from the last separation zone to a desorption zone, therein treating the adsorbent with a liquid organic solvent desorbing agent to displace the adsorbate from the adsorbent, said desorbing agent having an adsorption index falling within the area ABCDE of Fig. 2, withdrawing a mixture of desorbing agent and displaced adsorbate from the desorption zone and introducing it into a distillation zone, therein recovering the desorbing agent from said adsorbate, continuously returning a portion of the adsorbate having essentially the same composition as the total adsorbate to said last contact zone as reflux, withdrawing the remainder of the adsorbate as the olefinic product, passing non-adsorbed liquid obtained from the first separation zone to a second distillation zone and therein recovering desorbing agent from charge hydrocarbons, withdrawing such charge hydrocarbons from said second distillation zone as the saturate product of the process, and returning adsorbent saturated with desorbing agent to said first contact zone for re-use in the process.

10. Process according to claim 9 wherein the adsorbent is silica gel and the desorbing agent has an adsorption index falling within the area FCGH of Fig. 2.

11. Process according to claim 9 wherein the adsorbent is activated carbon and the desorbing agent has an adsorption index falling within the area FCGH of Fig. 2.

JOHN L. OLSEN.

REFERENCES CITED

The following references are of record in the file of this patent:

UNITED STATES PATENTS

| Number | Name | Date |
|---|---|---|
| 1,678,298 | Patrick et al. | July 24, 1928 |
| 2,077,287 | Tuttle | Apr. 13, 1937 |
| 2,168,875 | Noll | Aug. 8, 1939 |
| 2,441,572 | Hirschler et al. | May 18, 1948 |
| 2,470,339 | Claussen et al. | May 17, 1949 |